United States Patent [19]
Fullager

[11] 3,725,837
[45] Apr. 3, 1973

[54] PLATINUM RESISTANCE TEMPERATURE SENSORS

[75] Inventor: Harry Fullager, Bognor Regis, England

[73] Assignee: Rosemount Engineering Company Limited, Bognor Regis, England

[22] Filed: Sept. 13, 1971

[21] Appl. No.: 179,669

[52] U.S. Cl. .................................. 338/28, 236/92 R
[51] Int. Cl. ................................................ H01c 7/00
[58] Field of Search....338/28, 229; 73/342, 345, 343 R, 73/363 AR, 362 R, 339; 236/92 C, 92 R, 93

[56] References Cited

UNITED STATES PATENTS 3,153,342  10/1964  Pierce .................................. 73/301
2,450,263  9/1948  Wise ...................................... 338/28

Primary Examiner—C. L. Albritton
Attorney—Ralph L. Dugger et al.

[57] ABSTRACT

Platinum resistance thermometers with means for preventing ingress of moisture from the atmosphere at temperatures below 100°C., and preferably below 150°C., and for relieving the rise in pressure within the thermometer as the thermometer is heated. In one arrangement the thermometer has a metal sheath sealed apart from a vent and a closure member is provided on the free end of a bimetallic strip. In another arrangement, the closure member is carried on the end of a tube mounted within the metal sheath and having a coefficient of expansion different from that of the sheath. Other arrangements incorporate an aneroid-type bellows, a dessicator, and a temperature-sensitive sealing material allowing breathing only at elevated temperatures.

14 Claims, 5 Drawing Figures

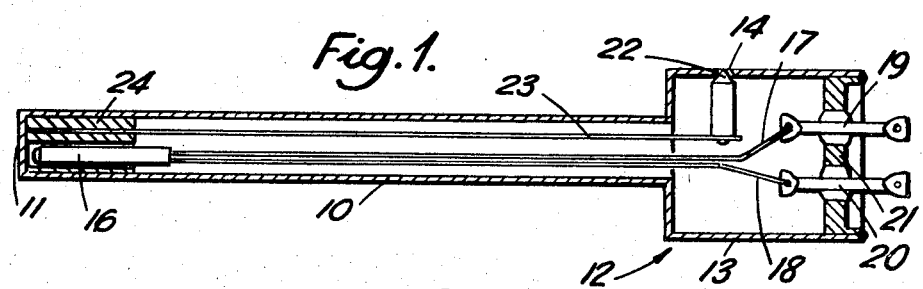
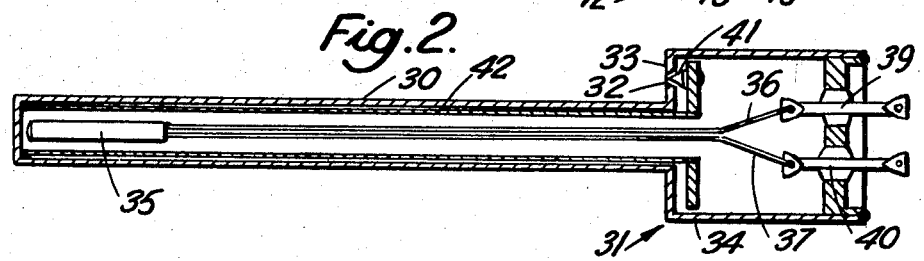
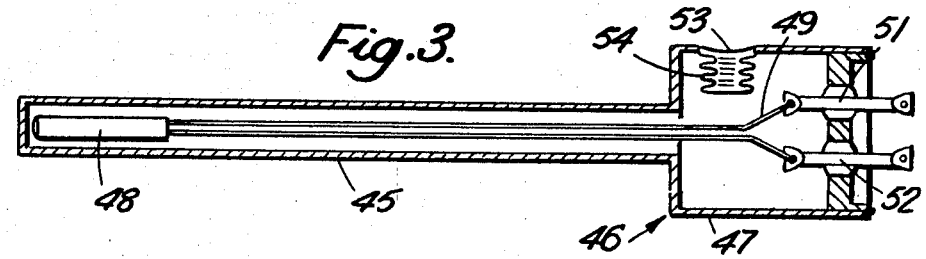
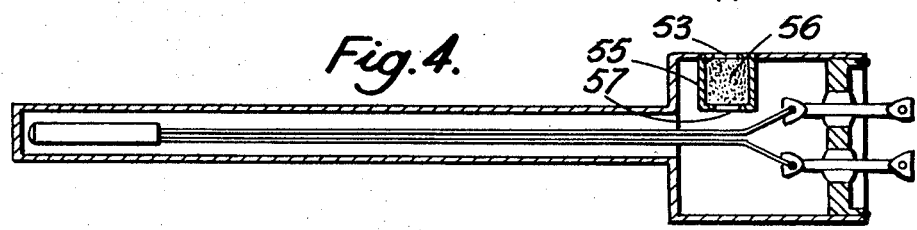
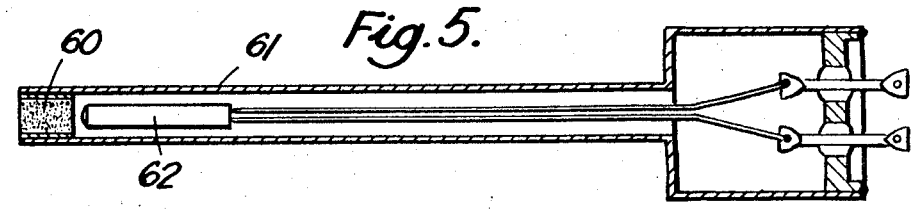

PLATINUM RESISTANCE TEMPERATURE SENSORS

BACKGROUND OF THE INVENTION

This invention relates to platinum resistance temperature sensors, particularly for measuring high temperatures.

It has heretofore always been the practice, when a platinum resistance temperature sensing element is used inside a metal sheath, to seal the platinum resistance assembly hermetically within the sheath. The reason for this is that, if the unit were to cool down under normal ambient conditions, there would always be the possibility of condensation forming within the sheath. This condensation could lead to loss of insulation resistance or act as a shunt resistor across the sensing element.

I have found that, in a number of circumstances, a rapid deterioration in the stability of the sensing element occurs when operating above a certain temperature. This deterioration in performance is particularly noticeable when the sensing element is sealed within a sheath containing iron. The reason for this is not fully understood. It would that the platinum is poisoned under these conditions. The problem is not overcome by sealing the sheath assembly under vacuum or by the use of a pure inert gas in the sheath at or above atmospheric pressure.

The present invention is based on the further discovery that the problem of the deterioration in performance is overcome or substantially overcome provided the pressure is prevented from rising substantially within the sheath.

SUMMARY

According to this invention there is provided a platinum resistance temperature sensor with a resistance element arranged in a metal sheath wherein means are provided for preventing the ingress of moisture from the atmosphere at temperatures below 100°C, and for relieving the rise in pressure in the sheath when the assembly is heated. Preferably said means are arranged so that, at temperatures above 500°C, the pressure in the sheath is atmospheric or not substantially above atmospheric. Said means may be arranged to seal the sheath at temperatures below 100°C and preferably below 150°C.

In one arrangement of the present invention, a platinum resistance temperature sensor assembly comprises a platinum resistance element arranged in a metal sheath, the sheath being hermetically sealed apart from a vent opening having a movable closure member with means moving the closure member to close the vent when the temperature in the neighborhood of the sensing element falls below 100°C or below a temperature in excess of 100°C. Conveniently the vent closure member is operated by a bimetallic strip or by other means utilizing the differential coefficients of linear expansion with temperature of two different materials. Provided the vent is closed at low temperatures i.e. below 100°C and preferably below 150°C and is open at high temperatures, e.g. above 500°C, the temperature at which the closure member operates is not critical and it is thus possible to utilize a very simple construction of bi-metallic operating device which will operate the closure member within the required temperature range despite the fact that, in operation, there may be wide variations in the temperature differentials between the two ends of the sheath.

In one convenient construction the sheath comprises a tubular portion with the sensing element mounted at one end thereof, the tubular portion at the other end opening into a larger diameter portion of the sheath containing a vent, the leads for the sensing element extending through hermetic seals in the larger diameter portion. The vent may be on a side wall of this enlarged diameter portion, in which case it is conveniently opened or closed by the actions of a bimetallic strip which extends along the length of or part of the length of the tubular portion and is secured to the tubular portion at or near the end remote from the vent. In another construction in which the sheath has a tubular portion with an enlarged diameter portion at the end remote from the sensing element, a vent is arranged in a shoulder formed by a radially extending wall joining the tubular portion to a cylindrical wall defining the enlarged diameter portion and a valve member for closing the vent is carried on a tube extending inside the aforementioned tubular portion and secured thereto at or near the end adjacent the sensor, this inner tube being of a material having a higher coefficient of expansion temperature than the tubular portion of the sheath so that the vent is opened at higher temperatures and closed at lower temperatures.

In another arrangement within the scope of the invention, a platinum resistance temperature sensor assembly comprises a resistance element within a metal sheath, the sheath being hermetically sealed apart from an opening to the atmosphere containing a dessicant. Thus the sheath assembly can "breathe" via the dessicant, so ensuring that the interior of the sheath remains at atmospheric pressure but preventing any moisture entering the sheath and condensing when the assembly cools down.

In yet another arrangement within the scope of the invention, a platinum resistance temperature sensor assembly comprises a platinum resistance element mounted in a sheath which is hermetically sealed and has an opening hermetically sealed to a bellows to permit free expansion of the gas in the sheath so as to keep the pressure from rising substantially above atmospheric.

In a further arrangement within the scope of the invention a platinum resistance thermometer assembly comprises a platinum resistance element mounted in a sheath which is hermetically sealed and has an aperture adjacent said element, there being sealed into the aperture a sealing device which allows breathing of the interior of the sheath at higher temperatures but not at lower temperatures. The sealing device being formed so that the differential coefficient of expansion of its constituent or component parts enable the sealing device to be gas tight at lower temperatures but to allow passages of gases at higher temperatures.

DESCRIPTION OF THE DRAWING

FIGS. 1 to 5 are each longitudinal sections through platinum resistance thermometer assemblies.

DETAILED DESCRIPTION

Referring to FIG. 1 there is shown a metal sheath having a tubular portion 10 closed at one end 11 and at the other end opening into an enlarged diameter portion 12 having a cylindrical wall 13. The complete sheath assembly including the tubular portion 10 and the enlarged diameter portion 12 is hermetically sealed apart from a vent opening 14. Within the sheath near the closed end of the tubular portion 10 is mounted a platinum resistance sensing element 16. This sensing element 16 is connected by leads 17, 18 extending through hermetic seals 19, 20 in the end wall 21 of the enlarged diameter portion. The vent 14 is closeable by means of a valve member 22 mounted on a bimetallic strip 23. This strip extends along the length of the tubular portion 10 and is rigidly secured in a block 24 attached to the wall of the tubular portion 10 near the sensing element 16. The bimetallic strip is arranged so that the vent 14 is closed at low temperatures, for example below about 150°C at the sensing element 16 but is opened at high temperatures, above for example 500°C. The bimetallic strip therefore has to effect the opening (or closing) operation at some temperature within this range. The exact temperature is not critical. It will be appreciated that the temperature may vary along the length of the sheath. For example the end containing the sensing element might be at a high temperature whereas the enlarged diameter portion may be at ambient temperature. For this reason the temperature at which the bimetallic strip operates the valve cannot be precisely defined in terms of the temperature of the sensing element but it is readily possible to ensure that the vent is closed below 150° C. and is open above 500°C.

FIG. 2 illustrates another construction of temperature sensor assembly. In this construction there is a metal outer sheath with a tubular portion 30 opening into an enlarged diameter portion 31 and forming a completely sealed assembly apart from a vent opening 32 which, in this construction, is in the shoulder formed by a radial wall 33 extending from the end of the tubular portion 30 to the cylindrical wall 34 of the enlarged diameter portion. A platinum resistance sensing element 35 is mounted near the closed end of the tubular portion 30 and has leads 36, 37 which are taken out through hermetic seals 39, 40 at the other end of the sheath. A valve member 41 for closing the vent is mounted on an inner tube 42 which extends along the length of and fits closely inside the tubular portion 30. This inner tube 42 is secured to the tubular portion 30 by welding near the closed end of the portion 30. The inner tube 42 has a higher coefficient of expansion with temperature than the outer metal sheath 30 so that the valve is opened at high temperatures but is closed at low temperatures.

FIG. 3 shows a construction of a temperature sensor assembly in which a metal sheath has a tubular portion 45, and an enlarged diameter portion 46 which has a cylindrical wall 47. A platinum resistance sensing element 48 is mounted within the sheath near the closed end of the tubular portion 45. The output of the sensing element 48 is taken out via leads 49, 50 through hermetic seals 51, 52 at the end of the sheath opposite the closed end where the sensing element is mounted. The cylindrical wall 47 has an aperture 53 in which is hermetically sealed a bellows 54. The bellows is made suitably flexible such that at elevated temperatures the gas within the sheath can expand and the pressure will not rise substantially above atmospheric.

FIG. 4 shows a similar construction to that of FIG. 3 but instead of a bellows there is a tube 55 sealed to aperture 53. The tube 55 contains a dessicant 56 and has an aperture 57 at the end opposite to the aperture 53. Thus the interior of the assembly will remain at atmospheric pressure and the dessicant will prevent ingress of moisture at all times.

FIG. 5 shows yet another construction of a temperature sensor assembly in which a seal 60 is mounted in the end of a tubular portion 61 of a metal sheath, adjacent a sensing element 62 mounted within the portion 61. The seal allows breathing of the interior of the assembly at high temperatures but prevents breathing at low temperatures below 100°C and preferably below 150°C. The seal performs this function by means of the differential coefficient of expansion of its component or constituent parts. The metal sheath is hermetically sealed elsewhere therefore the seal 60 is the only means by which the interior of the sheath can communicate with the external atmosphere, and then only at elevated temperatures.

I claim:

1. A platinum resistance temperature sensor with a resistance element arranged in a metal sheath wherein means are provided for preventing the ingress of moisture from the atmosphere at temperatures below 100°C, and for relieving the rise in pressure in the sheath when the assembly is heated.

2. A temperature sensor as recited in claim 1 wherein said means prevents the ingress of moisture at temperatures below 150°C.

3. A temperature sensor as recited in claim 1 wherein said means comprise an aperture in said metal sheath, and temperature controlled closure means for closing said aperture, the metal sheath being hermetically sealed except for said aperture.

4. A temperature sensor as recited in claim 2 wherein said temperature controlled closure means comprises a closure member, for closing said aperture, and operating means for moving said closure member, said operating means utilizing the differential coefficient of linear expansion with temperature between two different materials.

5. A temperature sensor as recited in claim 3 wherein said operating means comprises a bimetallic strip secured at one end to the metal sheath and carrying said closure member at the other end for closing said aperture.

6. A temperature sensor as recited in claim 3 wherein said operating means comprises a support element for said closure member, said support element being attached at one end to the metal sheath and carrying the closure member at the other end, the support element having a coefficient of expansion greater than that of the metal sheath.

7. A temperature sensor as recited in claim 1 wherein the metal sheath is hermetically sealed, and wherein said means comprises a bellows hermetically sealed to an aperture in the metal sheath, whereby gas in the sheath can expand thus reducing the rise in pressure of said gas.

8. A temperature sensor as recited in claim 1 wherein the metal sheath is hermetically sealed, and wherein said means comprises a dessicant held captive within a container, which container is sealed to an aperture in the metal sheath and is provided with means for permitting gaseous communication through the wall of the sheath via the dessicant.

9. A temperature sensor as recited in claim 1 wherein the metal sheath is hermetically sealed and wherein said means comprises a sealing device hermetically sealed to an aperture in the metal sheath close to the resistance element, said sealing device preventing gas flow through the device when at a temperature below 100°C, but otherwise permitting said gas flow, said device performing this function by means of the differential coefficient of expansion of its constituent parts.

10. A platinum resistance temperature sensor comprising an elongate metal sheath closed at one end, a resistance element mounted in the sheath at said one end, a terminal housing sealed to the other end of the sheath, an having a wall in which are sealed a plurality of terminals for providing electrical access to the resistance element, the housing having an opening, a valve member within the housing for closing the opening, a thermal expansion operating member mounted in said sheath and carrying the valve member, the thermal expansion operating member being arranged such that the opening is open at high temperatures and sealed at temperatures below 150°C.

11. A temperature sensor as recited in claim 10 wherein the thermal expansion operating member comprises an elongate bimetallic strip with one end secured to the sheath near said one end of the sheath, and the valve member mounted on the other end of the strip, and wherein the opening is transverse-facing and the bimetallic strip is arranged to move the valve member transversely to open and close the opening.

12. A temperature sensor as recited in claim 10 wherein the opening in the terminal housing is axial-facing and the thermal expansion operating member is an elongate tube with one end secured to the sheath at said one end of the sheath, and the valve member mounted on the other end of the tube, and wherein the coefficient of linear expansion of the tube is different from that of the sheath whereby the valve member is moved axially to open and close the opening.

13. A temperature sensor as recited in claim 12 wherein the opening faces outwardly towards said one end of the sheath and the coefficient of linear expansion of the tube is greater than that of the sheath.

14. A temperature sensor as recited in Claim 9 wherein the sealing device seals one end of the metal sheath, and wherein there is provided a terminal housing sealed to the other end of the sheath and having a wall in which are sealed a plurality of terminals for providing electrical access to the resistance element, said sealing device preventing said gas flow when at a temperatures below 150°C.

* * * * *